UNITED STATES PATENT OFFICE 2,560,950

PRODUCTION OF o-CRESOL DERIVATIVES

James D. Head, Midland, Mich., assignor to The Dow Chemical Company, Midland, Mich., a corporation of Delaware No Drawing. Application December 23, 1949, Serial No. 134,837

4 Claims. (Cl. 260—623)

This invention relates to the production of o-cresol derivatives, and, more particularly, to the dechlorination and reduction of 5-chloro-3-fluoro saligenin diacetate to 6-fluoro-o-cresol acetate, as well as to the hydrolysis of the 6-fluoro-o-cresol acetate to 6-fluoro-o-cresol.

It has been known that halogens can be removed from a benzene ring by the action of hydrogen in the presence of certain catalysts. It has also been known that ester groups can be reduced by the action of hydrogen in the presence of certain catalysts. However, so far as I am aware, it has not heretofore been known to be possible to remove selectively only one of two different halogens attached to a benzene ring in the course of a hydrogenation by means of which an ester group is reduced, i. e., to remove a chloro group and leave a fluoro group attached to the ring in the course of a hydrogenation which reduces an ester group. By the present invention it is possible to conduct a catalytic dehalogenation to remove the chloro group from 5-chloro-3-fluorosaligenin diacetate and to reduce the

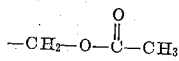

group thereof to —CH₃ without removing the fluoro group.

According to the invention, saligenin diacetate is dechlorinated and reduced to 6-fluoro-o-cresol acetate by the action of 2 mols of hydrogen per mol of the 5-chloro-3-fluoro saligenin diacetate. The dechlorination and reduction are accomplished at a hydrogen pressure of from about 10 to about 50 pounds per square inch gauge and in the presence of a palladium catalyst and an acceptor for the hydrogen ions formed by the dechlorination. Such an acceptor is a compound that reacts with the hydrogen ions to form a substance having an ionization constant not greater than $3 \times 10^{-4}$ (i. e., a substance that forms a one normal solution having a pH higher than about 3.5). The method of the invention is limited to the dechlorination and reduction of 5-chloro-3-fluorosaligenin diacetate. 6-fluoro-o-cresol acetate is produced by the dechlorination and reduction. The 6-fluoro-o-cresol acetate is a material having particular utility because it can be used as an intermediate for the production of 3-fluorosalicylaldehyde, which is a valuable compound for use in the preparation of oxygen-carrying chelates (see J. Am. Chem. Soc. 68, page 2254).

The dechlorination and reduction are carried out in a hydrogen atmosphere. It has been found that the dechlorination and reduction proceed when the hydrogen pressure is as low as about 10 pounds per square inch gauge, but it is usually preferred that the hydrogen pressure be at least about 20 pounds per square inch gauge. The reaction proceeds readily when the hydrogen pressure is as high as about 50 pounds per square inch gauge, but it is usually preferred, for economic reasons, that the pressure be not higher than about 40 pounds per square inch gauge. The reaction is continued until two mols of hydrogen have reacted per mol of the 5-chloro-3-fluoro saligenin diacetate (e. g., until the pressure drop indicates reaction to such an extent).

It is believed that palladium itself is the catalyst for the dehalogenation reaction. However, because of the high cost of palladium it is ordinarily desired that the palladium be supplied in the form of a coating on some carrier. Palladium is readily available on barium sulfate, calcium carbonate, and carbon as carriers, calcium carbonate being preferred as a carrier because it tends itself to prevent undue acidity in the mixture to be dechlorinated and reduced, carbon being preferred because such a catalyst is more easily available. Powdered palladium itself can be used as a catalyst, but is not employed, usually, because of its high cost. The amount of catalyst that is ordinarily used is from about 0.1 to about 2 per cent. (The terms "per cent" and "parts" are used herein to refer to per cent and parts by weight, unless otherwise indicated.) It is usually preferred to use from about 0.25 to about 0.5 per cent of the catalyst, based on the palladium actually present.

The hydrogen ion acceptor that is used in the practice of the invention can be any material that reacts with hydrogen ions to form a substance having an ionization constant not greater than $3 \times 10^{-4}$; preferably the ionization constant is not greater than about $3 \times 10^{-5}$. For example, sodium acetate, which reacts with hydrogen ions to form acetic acid, can be used as the hydrogen ion acceptor. Similarly, any inorganic base, or any organic base can be used as the hydrogen ion acceptor. It is usually preferred that the acceptor be water-soluble and that a water solution be used. However, the reaction can be conducted in a non-aqueous organic solution that comprises a hydrogen ion acceptor. Ordinarily, the reaction is run batchwise, and it is preferred to employ about one mol of the hydrogen ion acceptor per mol of the 5-chloro-3-fluorosaligenin diacetate; this is the amount of the hydrogen ion acceptor actually required to neutralize the hydrogen produced. However, a substantial excess (e. g., from two to three times the theoretical amount) may be employed; likewise the reaction proceeds with a deficiency, but only partial conversion is possible.

After the dechlorination and reduction of the 3-fluorosaligenin diacetate, the 6-fluoro-o-cresol acetate produced is hydrolyzed to 6-fluoro-o-cresol. The hydrolysis is accomplished in the presence of an acid or a base, preferably in the presence of at least about one mol of a base per mol of the 6-fluoro-o-cresol acetate.

The following example illustrates the new process, but is not to be construed as limiting the scope of the invention.

*Example*

In order to prepare the 5-chloro-3-fluorosaligenin diacetate needed as a starting material in the practice of the invention, it was found to be necessary to produce 4 - chloro - alpha - dimethylamino-6-fluoro-o-cresol, and to convert this compound to the 5-chloro-3-fluorosaligenin diacetate. The 4 - chloro - alpha - dimethylamino-6-fluoro-o-cresol was prepared according to the following procedure:

4-chloro-2-fluorophenol (1042 grams) and dimethyl amine (2615 grams of a 25 per cent aqueous solution) were added to a flask and the mixture was cooled to 30° C. Aqueous formaldehyde (a total of 628 grams of a 40 per cent aqueous solution) was added stepwise with stirring to this mixture. The formaldehyde was added at such a rate that the temperature of the mixture did not rise above 45° C. When the addition of formaldehyde was complete, the mixture was stirred thoroughly and was heated on a steam bath at about 80° C. for 18 hours. The liquid in the flask was then cooled and the oily prdouct which had separated was solidified by the addiiton of a few crystals of 4-chloro-alpha-dimethylamino - 6 - fluoro - o - cresol. The solid product (4 - chloro - alpha - dimethylamino - 6 - fluoro - o - cresol) which formed was broken and separated from the liquid by filtration; the filtrate was then cooled to 15° C. and further product which precipitated was separated by filtration and added to the original precipitate. The filtrate was then concentrated to about 700 cc. and additional 4-chloro-alpha-dimethylamino-6-fluoro-o-cresol was recovered by a steam distillation. The total recovery of the desired 4 - chloro - alpha - dimethylamino - 6 - fluoro-o-cresol amounted to 1376 grams which corresponds to a 95 per cent yield based on the 4-chloro-2-fluorophenol charged.

The 4 - chloro - alpha - dimethylamino - 6 - fluoro-o-cresol was converted to the 5 - chloro-3-fluorosaligenin diacetate needed as a starting material in the practice of the invention according to the following procedure:

A sample of the 4 - chloro - alpha - dimethylamino-6-fluoro-o-cresol produced as described in the preceding paragraph (345 grams) and acetic anhydride (800 cc.) were refluxed for 16 hours. Fractional distillation of the resulting product through an 18 inch column resulted in the isolation of 5-chloro-3-fluorosaligenin diacetate (360 grams), which corresponds to a yield of 82 per cent based upon the 4-chloro-alpha-dimethylamino-6-fluoro-o-cresol used.

In accordance with the invention, 6-fluoro-o-cresol acetate and 6-fluoro-o-cresol were produced by the following procedure:

Sodium acetate (25 grams), 5-chloro-3-fluorosaligenin diacetate (52 grams) and a methanol solution of palladium on a charcoal carrier (2 grams of a catalyst comprising 5 per cent of palladium dissolved in 150 cc. of methanol) were placed in a flask and subjected to a hydrogen atmosphere at a total pressure of about 40 pounds per square inch gauge. The flask was then placed on a commercial shaker and shaken for about 90 minutes (until a pressure drop of about 30 pounds per square inch indicated the reaction of about 0.4 mol of hydrogen). The catalyst was separated from the liquid by filtration and the filtrate was concentrated by distilling volatile matter until the liquid temperature was about 100° C. The residue after distillation of the volatile material (comprising 6-fluoro-o-cresol acetate) was dissolved in aqueous sodium hydroxide (200 cc. of a 10 per cent solution), and the resulting mixture was refluxed until solution was complete (about 90 minutes). This solution was acidified with sulfuric acid (about 250 grams of a 20 per cent solution), and 6-fluoro-o-cresol produced by the hydrolysis of the 6-fluoro-o-cresol acetate was recovered by a steam distillation from the acidified solution. The recovery of 17 grams of this prdouct indicated a 68 per cent yield based upon the 5 - chloro - 3 - fluorosaligenin diacetate charged. The 6-fluoro-o-cresol ($C_7H_7FO$;

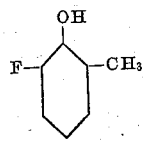

boiling point 158° C. to 162° C. at a total pressure of 745 mm. of mercury) is believed to be a new compound.

A second run was made by a procedure similar to that described in the preceding paragraph using ethanol as the reaction medium; the results were not materially different.

Having described the invention, I claim:

1. A method of producing 6-fluoro-o-cresol that comprises (1) dechlorinating and reducing 5-chloro-3-fluorosaligenin diacetate to 6-fluoro-o-cresol acetate by the action of two mols of hydrogen per mol of the 5-chloro-3-fluorosaligenin diacetate in the presence of a hydrogen ion acceptor and a palladium catalyst, and (2) hydrolyzing the 6-fluoro-o-cresol acetate to free 6-fluoro-o-cresol.

2. A method of effecting selective dehalogenation and reduction that comprises subjecting 5-chloro-3-fluorosaligenin diacetate to the action of two mols of hydrogen per mol of the 5-chloro-3-flurosaligenin diacetate in the presence of a hydrogen ion acceptor and a palladium catalyst.

3. A method as claimed in claim 1 in which the 6-fluoro-o-cresol acetate is hydrolyzed by the action of an aqueous base.

4. A method as claimed in claim 3 in which the initial hydrogen pressure is from about 40 pounds per square inch gauge to about 50 pounds per square inch gauge.

JAMES D. HEAD.

REFERENCES CITED

The following references are of record in the file of this patent:

UNITED STATES PATENTS

| Number | Name | Date |
| --- | --- | --- |
| 2,485,146 | Foster | Oct. 18, 1949 |

OTHER REFERENCES

Lock et al.: Berichte, 69B, 2253–8 (1936). Abstracted in Chemical Abstracts 31:382'.